Nov. 27, 1951  W. E. KOCK  2,576,463
METALLIC LENS ANTENNAS
Filed Dec. 30, 1947  2 SHEETS—SHEET 1

INVENTOR
W. E. KOCK
BY
A. J. Zerbarini
ATTORNEY

Nov. 27, 1951     W. E. KOCK     2,576,463
METALLIC LENS ANTENNAS
Filed Dec. 30, 1947     2 SHEETS—SHEET 2
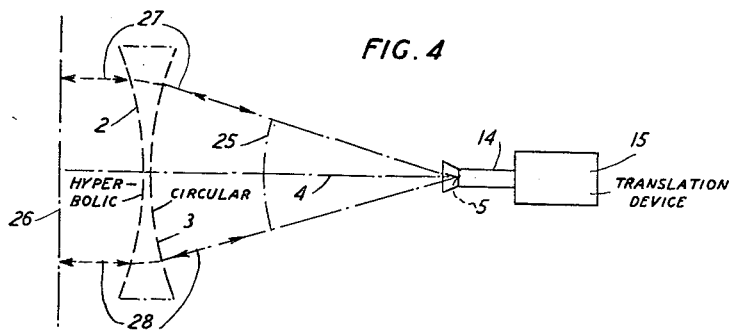
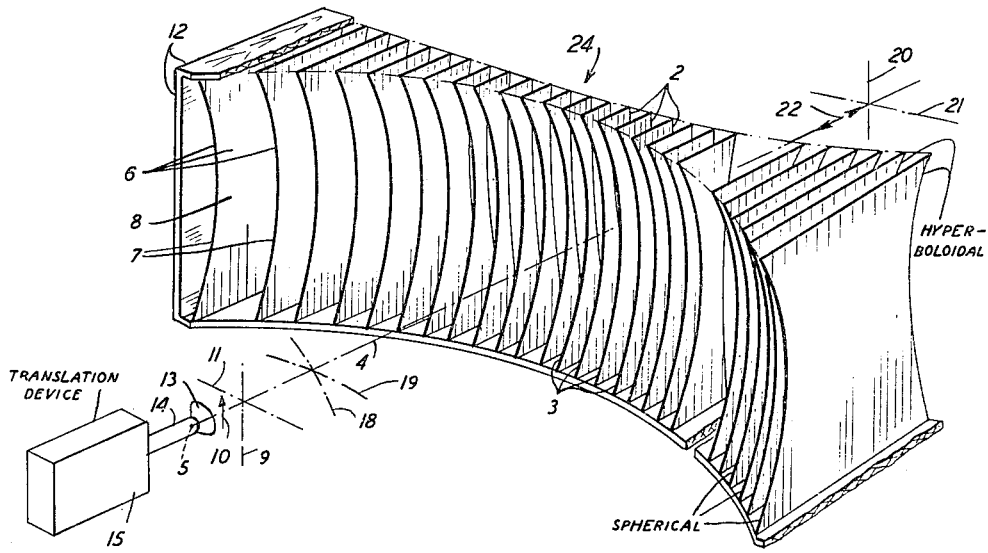
INVENTOR
*W. E. KOCK*
BY *A. J. Zerbarini*
ATTORNEY Patented Nov. 27, 1951

2,576,463

UNITED STATES PATENT OFFICE 2,576,463

METALLIC LENS ANTENNA

Winston E. Kock, Middletown, N. J., assignor to Bell Telephone Laboratories, Incorporated, New York, N. Y., a corporation of New York Application December 30, 1947, Serial No. 794,528

3 Claims. (Cl. 250—33.63)

This invention relates to directive radio systems and more particularly to lenses utilized in directive antenna systems.

My copending application, Serial No. 642,723, filed January 22, 1946, discloses and claims a "fast," or "phase advance," metallic lens having a refractive index smaller than unity and comprising a plurality of spaced parallel conductive plates. The lens is circularly symmetrical and has a point focus, the focussing being effected in all planes containing the electromagnetic axis of the lens. Also, the lens has a flat or plane front surface facing away from the focus and a concave surface facing towards the focus, the contour of the concave back surface or face being spheroidal or, in other words, prolate ellipsoidal, and hence elliptical in all planes containing the lens axis. While the above-mentioned fast plano-concave metallic lens has been successfully used and is highly satisfactory, it appears advantageous to utilize, in certain systems, a fast metallic lens which has a point focus but which is not circularly symmetrical, and to use in other systems a biconcave fast metallic lens.

It is one object of this invention to focus radio waves in an efficient and highly satisfactory manner.

It is another object of this invention to focus waves without appreciable attenuation and without substantial reflective losses.

It is still another object of this invention to obtain a simple, inexpensive, easily constructed and highly useful metallic fast radio lens having a point focus.

In accordance with one embodiment of the invention, a point-focus concavo-concave metallic lens comprises a plurality of parallel rectangular dielectric channels similar, in certain respects, to the channels of the plano-concave lens of my aforementioned copending application. The channels are positioned along a line perpendicular to the electromagnetic axis of the lens and each channel comprises the inner surfaces of a pair of vertical metallic plates or side walls and the air dielectric therebetween. The plates are parallel to the electric polarization of the wave and spaced at least a half wavelength apart. The back plate edges have the same elliptical curvatures, that is, the contour of the concave back face of the lens is elliptical in the plane of electric polarization, or so-called E-plane, and linear in the plane of magnetic polarization, or so-called H-plane. The contour of the concave front face is hyperbolic in the H-plane and linear in the E-plane, the front plate edges being linear. A point-type primary antenna, such as a conical horn, is positioned at the focal point of the lens and connected to a translation device. In transmission, a spherical wave front originating at the horn is converted by the lens into a plane wave front and, in reception, an incoming plane wave front is transformed into a spherical wave front converging on the horn. Stated differently, in both the E- and H-planes, the lens transforms a circular front originating at the horn to a linear front and transforms an incoming linear front to a circular front.

The invention will be more fully understood from a perusal of the following detail description taken in conjunction with the drawing on which like reference characters denote elements of similar function and on which:

Fig. 3 is a perspective view of still another embodiment of the invention, and

Fig. 4 is an explanatory diagram used in describing the embodiment of Fig. 3.

Figure 1:
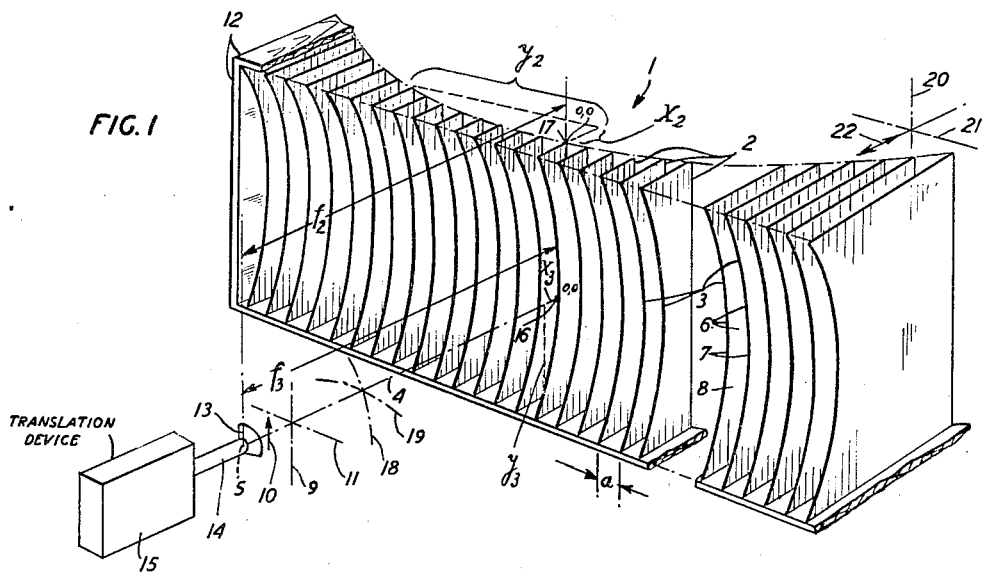
Fig. 1 is a perspective view of one embodiment of the invention.

Referring to Fig. 1, there is shown a fast metallic radio lens 1 having a front face 2, a back face 3, an electromagnetic axis 4, and a focus 5. The lens comprises a plurality of dielectric channels 6; and each channel comprises a pair of adjacent metallic plates or members 7 and the air dielectric 8 included therebetween. The plates 7 extend parallel to the E-plane 9 containing the electric polarization 10 of the waves propagated through the lens and are spaced apart in the H-plane 11 at least at half wavelength, as measured at the longest wave in the propagated band. Numeral 12 denotes a wooden frame for supporting, and maintaining in proper position, the metallic plates 7. A conical horn 13, constituting a primary antenna member, is positioned at the lens focus 5 and connected by a dielectric guide 14 to a translation device 15. The device 15 may be a transmitter, a receiver or a radar transceiver.

As shown in Fig. 1, the faces 2 and 3 of the lens 1 are cylindrically symmetrical and concave; and the geometrical axes of the cylinders corresponding to the faces 2 and 3 are perpendicular. More specifically, the contour of the back face 3 is elliptical in the E-plane 9 and linear in the H-plane 11, and hence the curvature of the back face 3 is cylindroidal. The front face 2 has a linear contour in the E-plane 9 and a hyperbolic curvature in the H-plane 11, so that the front face 2 has a cylindrical-hyperbolic shape. The equation for the elliptical curvature of the back face 3, as given in my above-mentioned copending application, is $$(1-n)^2 x_3^2 - 2(1-n) f_3 x_3 + y_3^2 = 0 \qquad (1)$$

where $f_3$ is the focal length for the back face 3, that is the distance along the lens axis 4 from the focus 5 to the vertex 16 of the back face 3, $x_3$ and $y_3$ are the coordinate axes for the elliptical curve, the origin being at the vertex 16, $n$ is the refractive index of each channel 6 and of the lens 1.

The refractive index $n$ is equal to $$\frac{v_0}{v} > 1 \qquad (2)$$

where $v_0$ and $v$ are, respectively, the phase velocity in free space and in any channel 6.

The equation for the hyperbolic curve corresponding to the contour of the front face 2, as derived in my copending concurrently filed application, Serial No. 794,529, is $$x_2^2 \left(\frac{1}{n^2} - 1\right) + 2 f_2 x_2 \left(\frac{1}{n} - 1\right) - y_2^2 = 0 \qquad (3)$$

where $f_2$ is the focal length for the front face, that is, the distance along the lens axis 4 from the focus 5 to the vertex 17 of the front face 2, $x_2$ and $y_2$ are the coordinate axes for the hyperbolic curve, the origin being at the vertex 17, and $n$ is the refractive index of each channel 6 and of the lens 1.

In operation, Fig. 1, assuming the device 15 is a transmitter, waves supplied by the device 15 over the guide 14 to the horn 13 and having the vertical polarization 10 are projected toward the elliptical-hyperbolic lens 1. The wave front emitted by the horn is spherical, or stated differently, the wave front emitted by the horn is circular in the E-plane 9 as shown by the curved line 18, and circular in the H-plane 11 as shown by the line 19. The E-plane circular front 18 is changed by the lens to a linear front 20 by reason of the concave contour in the E-plane 9 of the back lens face 3; and the H-plane circular front 18 is transformed to a linear front 21 by reason of the concave contour in the H-plane 11 of the front face 2, so that the outgoing wave 22 has a plane wave front. Also, the major lobe is relatively narrow in the E and H planes and a point-beam is obtained. Assuming now that device 15 is a receiver the operation is the converse. Thus, an incoming plane wave front is transformed by the lens into a spherical wave front converging on the focus 5, and the received energy is conveyed by guide 14 to device 15. Considered from a different standpoint, by reason of the concave contour in the H-plane of the front face 2, focussing action is secured in the H-plane; and, by reason of the concave contour in the E-plane 9 of the back face 3, focussing action in the E-plane 9 is obtained.

Figure 2:
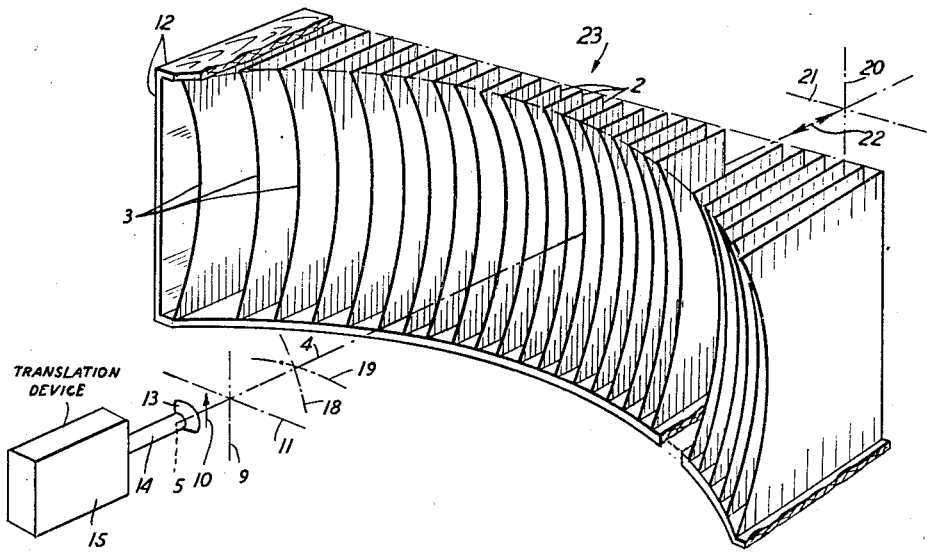
Fig. 2 is a perspective view of another embodiment of the invention.

The system illustrated by Fig. 2 is the same as the system of Fig. 1, except that the front face 2 of the metallic lens 23 is plane and the back face 3 has, in both the E-plane 9 and the H-plane 11, an elliptical contour in accordance with Equation 1. The lens 23, it will be noted, differs from the circularly symmetrical plano-concave lens disclosed in my above-mentioned application, Serial No. 642,723. In the lens of my copending application the concave face has a spheroidal or prolate ellipsoidal shape, as stated above, and the elliptical curvatures of the plates, in the E-plane, differ. In the lens 23 the concave face 3 is not ellipsoidal and the elliptical contours in the E-plane of the plates are the same. In operation, focussing action is obtained in both planes by reason of the elliptical contours of the front face 3, and a point-beam is obtained, as in the system of Fig. 1.

Referring to Fig. 3, the lens 24 is the same as the lens 1, except that the back face 3 has a spherical shape, the center of the sphere being at the focus 5; and the front face 2 has a hyperboloidal shape corresponding to that obtained by revolving the hyperbola of Equation 3 about its principal axis coincident with the lens axis 4 and passing through the vertex and focus of the hyperbola. The lens shape, in any plane containing the lens axis 4, is illustrated in Fig. 4 and, as shown in this figure, in each axial plane the front face 2 is hyperbolic and the back face 3 is circular.

In transmission, Fig. 3, the spherical-hyperboloidal lens 24 functions to transform the spherical wave front 18, 19 emitted by the horn 13 to a plane outgoing wave front 20, 21 and a point-beam is obtained. In reception the incoming plane wave front is converted to a spherical wave front converging on the focus 5. More particularly, as shown in Fig. 4, in each axial plane, the circular front 25 outgoing from the horn 13 is converted by the lens to an outgoing linear front 26 and, in reception, the converse operation is obtained. Stated differently, the incoming or outgoing rays, such as rays 27 and 28, are refracted by the lens and focussing in all axial planes is secured.

The spherical-hyperboloidal lens 24, Fig. 3, and the elliptical-hyperbolic lens 1, Fig. 1, should be distinguished from the circular-hyperbolic lens disclosed and claimed in my copending application Serial No. 794,529 filed on December 30, 1947. In general, the lens of the present invention has a point-focus and a point-beam pattern, whereas the lenses of my concurrently filed application have a line focus and a fan-beam pattern, that is, focussing in only one axial plane is secured.

Although the invention has been explained in connection with certain embodiments, it is not to be limited to the embodiments described inasmuch as other apparatus may be successfully utilized in practicing the invention.

What is claimed is:

1. A biconcave electromagnetic metallic lens for focussing waves having a given wavelength, said lens having a point-focus and comprising a plurality of parallel dielectric channels, each channel comprising a pair of parallel flat metallic members and a dielectric medium included therebetween, said members having one set of longitudinal edges facing toward said focus and constituting one concave side of said lens and another set of longitudinal edges facing away from said focus and constituting the opposite concave side of said lens, one of said sides having in a given plane an elliptical contour and the other of said sides having in a plane perpendicular to said first-mentioned plane a hyperbolic contour.

2. A lens in accordance with claim 1, said dielectric medium being air and the spacing between the pair of flat members in each channel being greater than one half of said wavelength.

3. A device for effecting changes in the directivity of radio wave energy which comprises a plurality of flat metallic members spaced apart side by side in a like plurality of parallel planes, a first set of edges of said plurality of members lying in and defining a concave surface substantially in a first plane, a second set of edges of said members opposite said first set, lying in and defining a concave surface substantially in a second plane the direction of concavity of said second plane being perpendicular to the direction of concavity of said first plane.

WINSTON E. KOCK.

REFERENCES CITED

The following references are of record in the file of this patent:

UNITED STATES PATENTS

| Number | Name | Date |
|---|---|---|
| 880,208 | Germain et al. | Feb. 25, 1908 |
| 1,507,212 | Silberstein | Sept. 2, 1924 |
| 2,206,683 | Wolff | July 2, 1940 |
| 2,442,951 | Iams | June 8, 1948 |
| 2,479,673 | De Vore | Aug. 23, 1949 |

FOREIGN PATENTS

| Number | Country | Date |
|---|---|---|
| 327,312 | France | Mar. 23, 1903 |

OTHER REFERENCES

Electronics, March 1946, p. 101.
Radio-Craft, June 1946, p. 602.
Proceedings I. R. E., vol. 34, pp. 828–836, November 1946.